(12) United States Patent
Chung et al.

(10) Patent No.: US 11,509,173 B2
(45) Date of Patent: Nov. 22, 2022

(54) METHOD OF WIRELESS CHARGING AND ELECTRONIC DEVICE SUPPORTING WIRELESS CHARGING

(71) Applicant: Samsung Electronics Co., Ltd., Suwon-si (KR)

(72) Inventors: Myungkyoon Chung, Suwon-si (KR); Haekwon Lee, Suwon-si (KR); Dongil Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 17/011,109

(22) Filed: Sep. 3, 2020

(65) Prior Publication Data

US 2021/0066974 A1 Mar. 4, 2021

(30) Foreign Application Priority Data

Sep. 3, 2019 (KR) .................. 10-2019-0108883

(51) Int. Cl.
*H02J 7/34* (2006.01)
*H02J 50/80* (2016.01)
(Continued)

(52) U.S. Cl.
CPC ........ *H02J 50/80* (2016.02); *H02J 7/007188* (2020.01); *H02J 50/10* (2016.02); *H04B 5/0037* (2013.01)

(58) Field of Classification Search
CPC ...... H02J 50/80; H02J 7/007188; H02J 50/10; H02J 7/342; H02J 50/005; H02J 50/90; H04B 5/0037; H04L 43/10
See application file for complete search history.

(56) References Cited

U.S. PATENT DOCUMENTS 9,155,047 B2 10/2015 You et al.
9,444,282 B2 9/2016 Won et al.
(Continued)

FOREIGN PATENT DOCUMENTS

KR 10-2011-0103297 A 9/2011
KR 10-2016-0105079 A 9/2016
(Continued)

OTHER PUBLICATIONS

International Search Report and written opinion dated Dec. 24, 2020, in the International Application No. PCT/KR2020/011716.

*Primary Examiner* — Nghia M Doan
(74) *Attorney, Agent, or Firm* — Jefferson IP Law, LLP

(57) ABSTRACT

A method for wireless charging an electronic device and a method therefor are provided. The electronic device includes a near field communication device, a wireless charging device including a conductive coil, and at least one processor operatively connected to the near field communication device and the wireless charging device. The at least one processor is configured to transmit a first ping, using the near field communication device, receive first acknowledgement (ACK) information responsive to the first ping from an external electronic device, transmit a second ping, using the wireless charging device, based on that the first ACK information is received, and control the wireless charging device such that a charging current flows through the conductive coil based on second ACK information responsive to the second ping being received from the external electronic device within a specified time from the transmission of the second ping.

20 Claims, 9 Drawing Sheets

(51) Int. Cl.
*H02J 50/10* (2016.01)
*H02J 7/00* (2006.01)
*H04B 5/00* (2006.01)

(56) References Cited

U.S. PATENT DOCUMENTS

| | | | |
|---|---|---|---|
| 9,973,237 | B2 | 5/2018 | Lee et al. |
| 10,410,788 | B1 | 9/2019 | Bana et al. |
| 10,651,694 | B2 | 5/2020 | Park |
| 2013/0207599 | A1* | 8/2013 | Ziv ........................ H02J 50/80 320/108 |
| 2015/0215005 | A1 | 7/2015 | Toivanen et al. |
| 2017/0207658 | A1 | 7/2017 | Bana et al. |
| 2018/0227017 | A1 | 8/2018 | Lee et al. |
| 2019/0173309 | A1 | 6/2019 | Jung |
| 2020/0251937 | A1 | 8/2020 | Park |
| 2020/0280198 | A1 | 9/2020 | Kwon et al. |

FOREIGN PATENT DOCUMENTS

| | | |
|---|---|---|
| KR | 10-2017-0136353 A | 12/2017 |
| KR | 10-1917688 B1 | 11/2018 |
| KR | 10-1924341 B1 | 12/2018 |
| KR | 10-2019-0026424 A | 3/2019 |
| WO | 2017/209502 A1 | 12/2017 |
| WO | 2017/213428 A1 | 12/2017 |

\* cited by examiner

METHOD OF WIRELESS CHARGING AND ELECTRONIC DEVICE SUPPORTING WIRELESS CHARGING

CROSS-REFERENCE TO RELATED APPLICATION(S)

This application is based on and claims priority under 35 U.S.C. § 119 of a Korean patent application number 10-2019-0108883, filed on Sep. 3, 2019, in the Korean Intellectual Property Office, the disclosure of which is incorporated by reference herein in its entirety.

BACKGROUND

1. Field

The disclosure relates to a method of wireless charging an external electronic device and an electronic device supporting a wireless charging.

2. Description of Related Art

An electronic device provides various functions or services, based on so-called digital convergence, in which various information and communication technologies are fused. Correspondingly, an importance of a battery, which is a pivotal basis for a function or service operation of the electronic device, is emerged, and a charging method for enhancing a power management of the battery is proposed. For example, a recent electronic device may charge the battery of an external electronic device by wirelessly supplying power to the external electronic device, or may support a wireless charging function that charges a mounted battery by wirelessly receiving the power from the external electronic device.

The above information is presented as background information only to assist with an understanding of the disclosure. No determination has been made, and no assertion is made, as to whether any of the above might be applicable as prior art with regard to the disclosure.

SUMMARY

When operating a wireless charging function (e.g., wireless charging transmit (Tx) function) of an electronic device for supplying wireless power to an external electronic device, a user control may be required. For example, the electronic device may initiate a series of wireless charging protocols in response to a user input reception that controls an activation of the wireless charging function. Therefore, whenever the wireless charging function of the electronic device is operated, a user's hassle may occur in connection with the activation of the wireless charging function, which may reduce the usability of the wireless charging function of the electronic device or may increase a time required for a wireless charging.

Aspects of the disclosure are to address at least the above-mentioned problems and/or disadvantages and to provide at least the advantages described below. Accordingly, an aspect of the disclosure is to provide a wireless charging method and an electronic device supporting the same, which may exclude a separate user control related to an activation of the wireless charging function of the electronic device and may support the wireless charging for an external electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a near field communication device, a wireless charging device including a conductive coil, and at least one processor operatively connected to the near field communication device and the wireless charging device. The at least one processor transmits a first ping using the near field communication device, receives first acknowledgement (ACK) information responsive to the first ping from an external electronic device, transmits a second ping using the wireless charging device, based on the first ACK information being received, and controls the wireless charging device such that a charging current flows through the conductive coil based on the second ACK information responsive to the second ping being received from the external electronic device within a specified time from the transmission of the second ping.

In accordance with another aspect of the disclosure, a method of wireless charging an electronic device is provided. The method includes transmitting a first ping using a near field communication device of the electronic device, receiving first acknowledgement (ACK) information responsive to the first ping from an external electronic device, transmitting a second ping using the wireless charging device of the electronic device, based on the first ACK information being received, and controlling the wireless charging device such that a charging current flows through a conductive coil of the wireless charging device based on second ACK information responsive to the second ping being received from the external electronic device within a specified time from the transmission of the second ping.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Hereinafter, various embodiments of the disclosure may be described with reference to accompanying drawings. Accordingly, those of ordinary skill in the art will recognize that modifications, equivalents, and/or alternatives on the various embodiments described herein can be variously made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
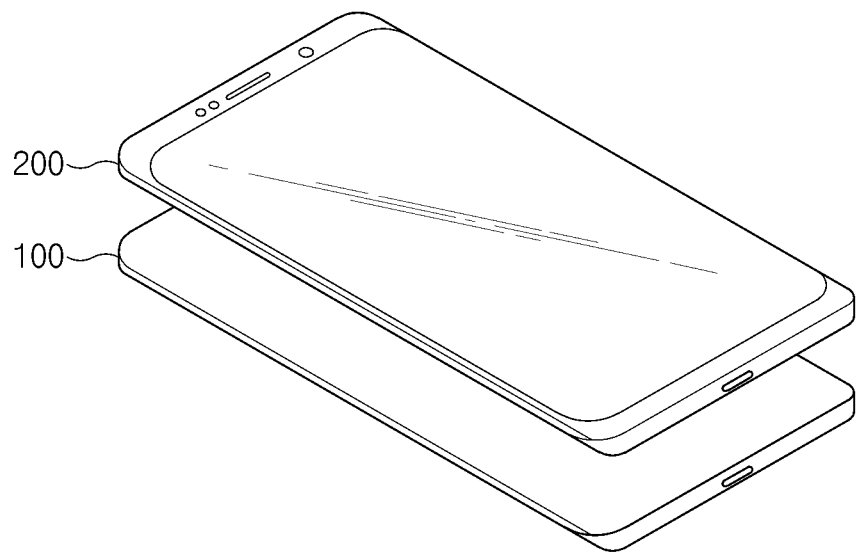
FIG. 1A is a diagram illustrating an example of wireless charging of an electronic device to an external electronic device according to an embodiment of the disclosure.

FIG. 1A is a diagram illustrating an example of wireless charging of an electronic device to an external electronic device according to an embodiment of the disclosure.

Figure 1B:
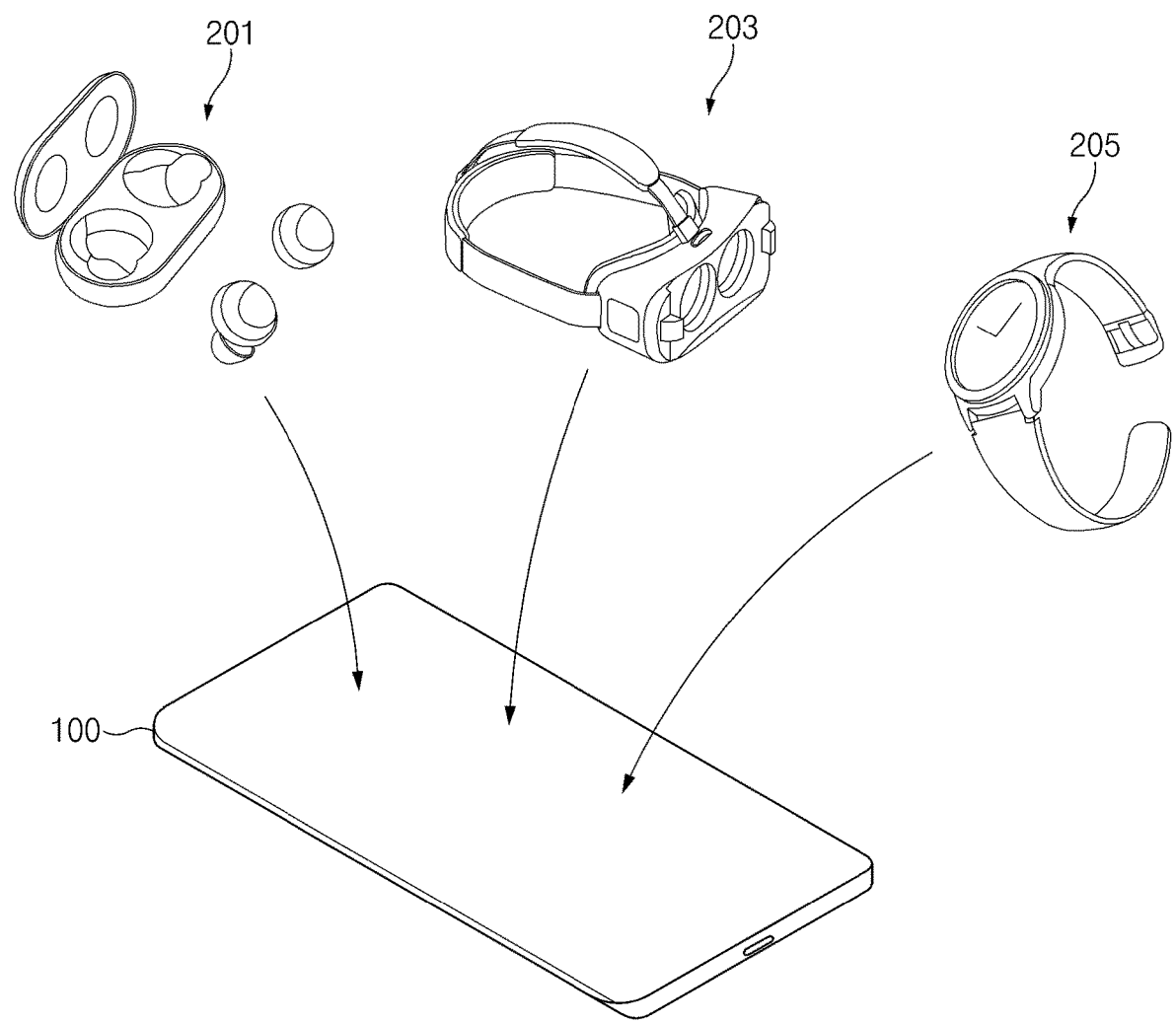
FIG. 1B is a diagram illustrating another example of wireless charging of an electronic device to an external electronic device according to an embodiment of the disclosure.

FIG. 1B is a diagram illustrating another example of wireless charging of an electronic device to an external electronic device according to an embodiment of the disclosure.

Figure 2:
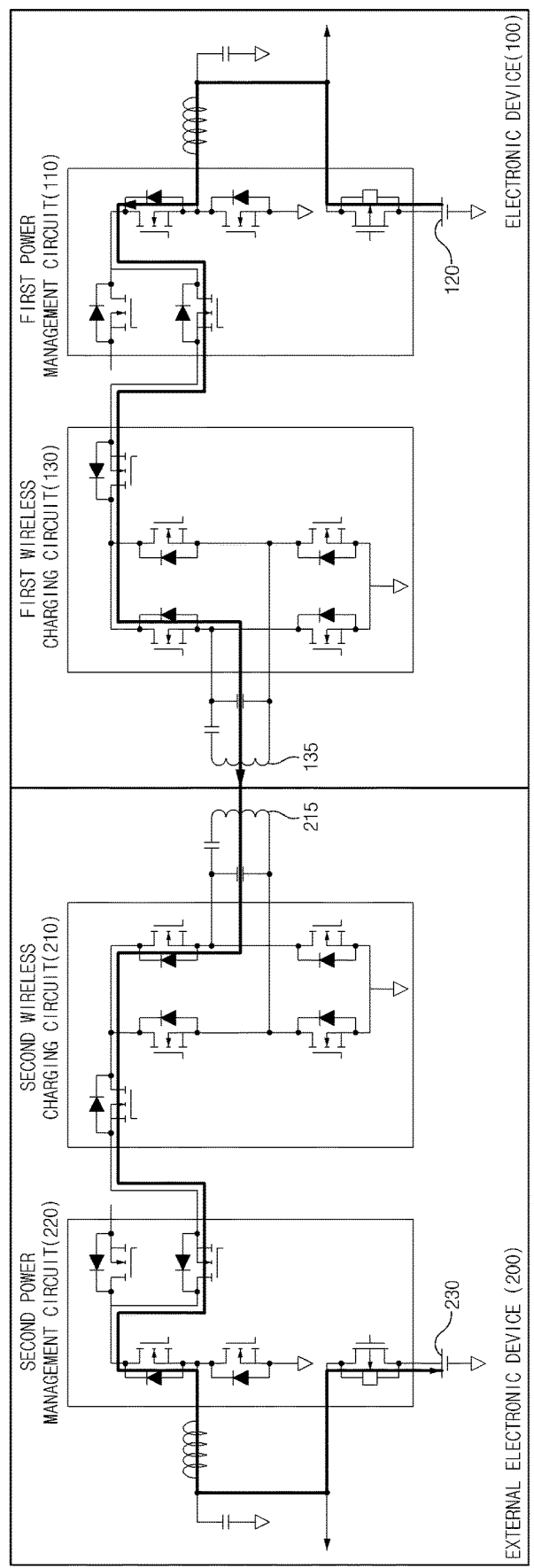
FIG. 2 is a diagram illustrating a wireless power flow between an electronic device and an external electronic device, according to an embodiment of the disclosure.

FIG. 2 is a diagram illustrating a wireless power flow between an electronic device and an external electronic device, according to an embodiment of the disclosure.

Referring to FIGS. 1A, 1B, and 2, an electronic device 100 according to an embodiment may charge an external electronic device 200 through wireless power transmission. For example, in a state in which a battery of the external electronic device 200 is discharged, or in a state in which an amount of available power of the battery is below a specified level, when the electronic device 100 is in contact with the external electronic device 200 or is adjacent to the external electronic device 200 within a specified distance (e.g., about 0.5 cm), the electronic device 100 may wirelessly transmit power to the external electronic device 200.

In an embodiment, the electronic device 100 may charge the external electronic device 200 using a magnetic induction method. In this regard, the electronic device 100 may include a first power management circuit 110 (e.g., an interface power management integrated circuit (IF PMIC)) (or first power management device), a first battery 120, and a first wireless charging circuit 130 (e.g., an magnetic field communication integrated circuit (MFC IC) (or a first wireless charging device)) including a first conductive coil 135. Likewise, the external electronic device 200 may include a second wireless charging circuit 210 (e.g., the MFC IC) including a second conductive coil 215, a second power management circuit 220 (e.g., the IF PMIC), and a second battery 230.

According to an embodiment, the first power management circuit 110 may transfer power supplied from the first battery 120 to the first wireless charging circuit 130. The first wireless charging circuit 130 may control the charging current to flow through the first conductive coil 135 in response to a reception of the power. When a current change in the first conductive coil 135 occurs due to the charging current, an induction current may flow in the second conductive coil 215 of the external electronic device 200 that is in contact with or adjacent to the electronic device 100. The induction current may flow through, for example, the second wireless charging circuit 210 and the second power management circuit 220, and the second power management circuit 220 may use the induction current to charge the second battery 230. According to the above-described wireless charging protocol, the electronic device 100 wirelessly transmits the power of the first battery 120 to the external electronic device 200, thereby charging the second battery 230 of the external electronic device 200.

According to various embodiments, the electronic device 100 may function as a wireless charging Tx device that charges the second battery 230 of the external electronic device 200 through the wireless power transmission to the external electronic device 200. In contrast, the electronic device 100 may also function as a receive (Rx) device that charges the first battery 120 through a wireless power reception from the external electronic device 200. When the electronic device 100 functions as the Rx device, the induction current may flow through the first conductive coil 135 of the electronic device 100 by the charging current flowing through the second conductive coil 215 of the external electronic device 200, and the first power management circuit 110 may charge the first battery 120 using the induction current. In various embodiments below, the electronic device 100 and the external electronic device 200 may function as both the Tx device capable of transmitting the wireless power and the Rx device capable of receiving the wireless power. Alternatively, the electronic device 100 may function as both the Tx device and the Rx device, and the external electronic device 200 may function only as the Rx device.

In various embodiments, the electronic device 100 and the external electronic device 200 may be devices identical to each other or similar devices of the same type. For example, the electronic device 100 and the external electronic device 200 may include a mobile device (e.g., a smart phone). In another embodiment, the electronic device 100 and the external electronic device 200 may be heterogeneous devices that are different from each other at least partially. For example, as illustrated in FIG. 1B, the electronic device 100 may include the mobile device (e.g., the smart phone), and the external electronic device 200 may include a wearable device (e.g., a wireless earphone 201, a head mounted display device 203, or a smart watch (or band) 205).

According to various embodiments, the electronic device 100 may function as at least one of the Tx device capable of transmitting the wireless power to the external electronic device 200 or the Rx device capable of receiving the wireless power from the external electronic device 200, using a magnetic resonance method, in addition to the magnetic induction method described above.

Figure 3:
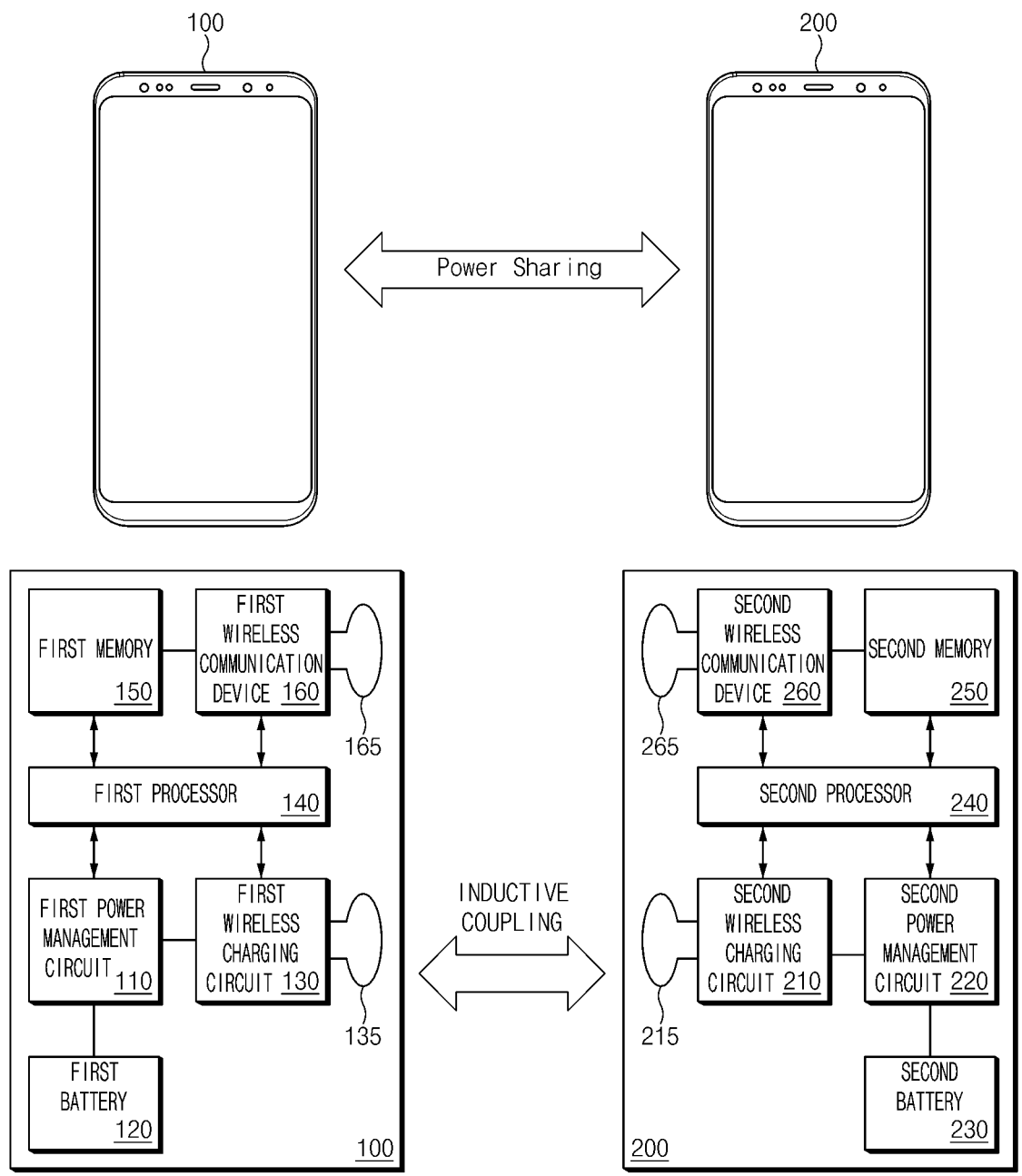
FIG. 3 is a diagram illustrating a configuration of an electronic device and an external electronic device that share wireless power, according to an embodiment of the disclosure.

FIG. 3 is a diagram illustrating a configuration of an electronic device and an external electronic device that share wireless power, according to an embodiment of the disclosure.

Referring to FIG. 3, the electronic device 100 according to an embodiment may include the first power management circuit 110, the first battery 120, the first wireless charging circuit 130, a first processor 140, a first memory 150, and a first wireless communication device 160 (e.g., a transceiver). In various embodiments, the electronic device 100 may omit at least one of the above-described components, or may additionally include other components. For example, the electronic device 100 may further include a sensor device that senses various types of information associated with an operating environment of the electronic device 100. According to an embodiment, the sensor device may include at least one of a hall sensor, a proximity sensor, a pressure sensor, a position sensor, a geomagnetic sensor, an acceleration sensor, and a six-axis sensor.

In one embodiment, the external electronic device 200 may include components identical or similar to those of the electronic device 100 described above. For example, the external electronic device 200 may include the second wireless charging circuit 210, the second power management circuit 220, the second battery 230, a second processor 240, a second memory 250, and a second wireless communication device 260. Unless otherwise specified, descriptions of the components of the electronic device 100 mentioned below may equally or similarly be applied to components of the external electronic device 200 corresponding to each of the components of the electronic device 100.

In one embodiment, the first power management circuit 110 is connected to the first battery 120 to manage overall power management for the electronic device 100. For example, the first power management circuit 110 may charge the first battery 120 using power supplied wiredly and/or wirelessly. Alternatively, the first power management circuit 110 may discharge the first battery 120 to supply the power to the components of the electronic device 100. For example, the first power management circuit 110 may convert the power stored in the first battery 120 into a voltage level required by components of the electronic device 100 and may supply the converted power to the components, or when the electronic device 100 functions as the wireless charging Tx device, the first power management circuit 110 may supply the power stored in the first battery 120 to the first wireless charging circuit 130. According to an embodiment, the electronic device 100 may include an interface (e.g., a universal serial bus (USB) connector) that is to be connected to an external power device. The first power management circuit 110 may communicate (e.g., a USB battery charging specification communication, a universal serial bus power delivery (USB PD) communication, an automatic frequency control (AFC) communication, and/or a quick charge (QC) communication) with the external power device connected to the electronic device 100 through the interface.

In one embodiment, the first wireless charging circuit 130 may support the wireless charging function of the electronic device 100. In this regard, the first wireless charging circuit 130 may include a full bridge circuit. When the electronic device 100 functions as the wireless charging Tx device, the first wireless charging circuit 130 may allow the full bridge circuit to be driven as an inverter that converts a direct current (DC) power into an alternating current (AC) power. Alternatively, when the electronic device 100 functions as the wireless charging Rx device, the first wireless charging circuit 130 may allow the full bridge circuit to be driven as a rectifier that converts the AC power into the DC power. In one embodiment, the first wireless charging circuit 130 may include the first conductive coil 135 and a transmit/receive integrated chip (TRX) IC, which transmits or receives the wireless power.

According to one embodiment, the first wireless charging circuit 130 may share information necessary for the wireless power transmission through an in-band communication or an out-band communication with the external electronic device 200, based on a wireless power consortium (WPC) standard. The in-band communication may be a communication method in which data between the electronic device 100 and the external electronic device 200 may be shared through a frequency modulation or an amplitude modulation of a wireless power signal, for example, in an operation of the wireless power sharing between the first conductive coil 135 included in the first wireless charging circuit 130 and the second conductive coil 215 included in the second wireless charging circuit 210 of the external electronic device 200. The out-band communication may include, for example, at least one of a near field communication, a Bluetooth communication, and a Wi-Fi communication.

In one embodiment, the first conductive coil 135 included in the first wireless charging circuit 130 may be formed to include a spiral pattern, and may include a first pattern for transmitting the wireless power to the external electronic device 200 and a second pattern for receiving the wireless power from the external electronic device 200. According to various embodiments, a magnetic field shielding member (e.g., a sheet) may be disposed in an adjacent region of the first conductive coil 135. The magnetic field shielding member may shield at least a portion of the magnetic field such that, for example, the magnetic field formed from the first conductive coil 135 directs only a rear direction (e.g., an upward direction with respect to the electronic device 100 illustrated in FIG. 1) of the electronic device 100.

In an embodiment, the first processor 140 may be implemented with at least one of a central processing unit, an application processor, and a communication processor, and may control components of the electronic device 100. For example, the first processor 140 is electrically or operatively connected to components of the electronic device 100 to transfer at least one command related to a functional operation to the components or to perform various operations or data processing. In an embodiment, when the electronic device 100 functions as the wireless charging Tx device, the first processor 140 may allow the first wireless charging circuit 130 to flow the charging current through the first conductive coil 135 such that the power by the first battery 120 is wirelessly transmitted to the external electronic device 200 that is in contact with or adjacent to the electronic device 100. Alternatively, when the electronic device 100 functions as the wireless charging Rx device, the first processor 140 may control the first power management circuit 110 such that the first battery 120 is charged based on the induction current that flows through the first conductive coil 135 by the external electronic device 200 in contact with or adjacent to the electronic device 100.

In an embodiment, the first memory 150 may store at least one data related to the operation of the wireless charging function of the electronic device 100, or may store at least one instruction related to the functional operation of the components of the electronic device 100. For example, the first memory 150 may store at least one authentication data that are referred to authentication of at least one external electronic device (e.g., the external electronic device 200) sharing the wireless power with the electronic device 100. The at least one authentication data may include, for example, unique identification information (e.g., wireless communication identification (ID)) assigned to the at least one external electronic device to perform the wireless power sharing with the electronic device 100.

In one embodiment, the first wireless communication device 160 may support the wireless communication between the electronic device 100 and at least one external electronic device (e.g., the external electronic device 200). For example, the first wireless communication device 160 may establish the wireless communication according to a prescribed protocol with the at least one external electronic device, and may transmit and receive a specified signal or data through the wireless communication. According to an embodiment, the first wireless communication device 160 may include a near field communication integrated circuit (NFC IC) that supports a near field communication.

In an embodiment, a third conductive coil 165 (or conductor, or conductive pattern) included in the first wireless communication device 160 may support transmission of a signal or data from the electronic device 100 to the at least one external electronic device (e.g., the external electronic device 200), or may support reception of a signal or data from the at least one external electronic device. In one embodiment, the third conductive coil 165 may configure at least one of a near field communication (NFC) antenna, a magnetic secure transmission (MST) antenna, and fifth generation (5G) antenna that supports an operation of a fifth generation mobile communication (e.g., a wireless communication using a frequency band of 20 GHz or higher). The third conductive coil 165 may be implemented as at least one of the NFC antenna, the MST antenna, and the 5G antenna, to support access of the electronic device 100 to a legacy network including a second generation (2G), a third generation (3G), a fourth generation (4G), and/or a long term evolution (LTE), or to support access of the electronic device 100 to a 5G network defined by $3^{rd}$ Generation Partnership Project (3GPP). For example, a fourth conductive coil 265 (or conductor, or conductive pattern) may function in a manner similar to that of the third conductive coil 165.

Figure 4:
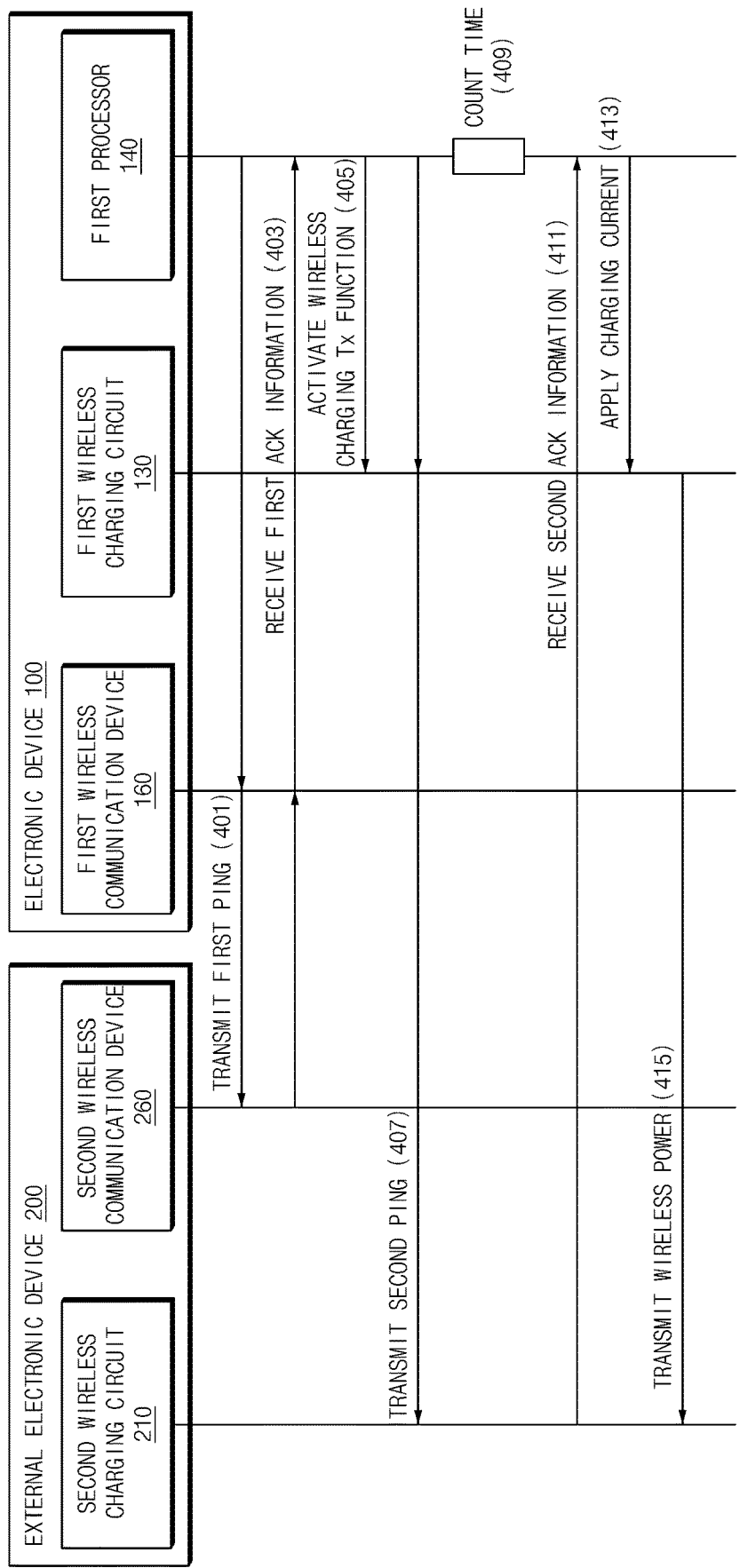
FIG. 4 is a diagram illustrating a signal flow between an electronic device and an external electronic device that share wireless power, according to an embodiment of the disclosure.

FIG. 4 is a diagram illustrating a signal flow between an electronic device and an external electronic device that share wireless power, according to an embodiment of the disclosure.

Referring to FIG. 4, in operation 401, the first processor 140 of the electronic device 100 may control the first wireless communication device 160 to transmit a specified first ping. The first ping may be, for example, a signal for determining whether there is the external electronic device 200 in contact with the electronic device 100 or adjacent to the electronic device 100 within a specified distance, or may be a signal for determining whether a signal transmitted from the electronic device 100 can reach the external electronic device 200 through a network. According to an embodiment of the disclosure, the first processor 140 may allow the first wireless communication device 160 to transmit the first ping in real time or at a specified period by performing the near field communication. According to another embodiment, when the first processor 140 determines a state in which the electronic device 100 is turned over and settled down (e.g., a state in which a front surface of the electronic device 100 is settled down toward the ground), based on the six-axis sensor of the sensor device included in the electronic device 100, the first processor 140 may allow the first wireless communication device 160 to transmit the first ping.

In operation 403, the first processor 140 may receive first ACK information (or signal) responsive to the first ping from the second wireless communication device 260 of the external electronic device 200 through the first wireless communication device 160. The first processor 140 may recognize that the external electronic device 200 is in contact with the electronic device 100 or is adjacent to the electronic device 100 within the specified distance, based on the reception of the first ACK information. Alternatively, the first processor 140 may determine that a signal can be reached between the electronic device 100 and the external electronic device 200 depending on the reception of the first ACK information.

According to various embodiments of the disclosure, at a time before performing the operation 401, the first processor 140 may determine whether there is the external electronic device 200 in contact with the electronic device 100 or adjacent to the electronic device 100 within a specified distance, using the sensor device. In this regard, the hall sensor may be disposed in one region of a rear surface of the electronic device 100, and a magnetic material may be disposed in one region of a rear surface of the external electronic device 200. The first processor 140 may recognize the contact or proximity of the external electronic device 200 to the electronic device 100, based on a change in a voltage output from the hall sensor due to the magnetic material of the external electronic device 200. Alternatively, at least one of a pressure sensor and a proximity sensor may be disposed in one region of a rear surface of the electronic device 100, and the first processor 140 may recognize the contact or proximity of the external electronic device 200 to the electronic device 100, based on a sensing signal output from at least one of the pressure sensor and the proximity sensor.

In an embodiment, when the external electronic device 200 in contact with or adjacent to the electronic device 100 is recognized using the sensor device, the first ping transmitted in operation 401 may function as a signal for authentication of the recognized external electronic device 200. For example, the first processor 140 may identify the first ACK information received from the external electronic device 200, based on the transmission of the first ping, and may determine whether the first ACK information includes the specified authentication data (e.g., a wireless communication ID of the external electronic device 200). In an embodiment, when the first ACK information transmitted from the external electronic device 200 includes the authentication data, the first processor 140 may determine whether the authentication data (e.g., the wireless communication ID of the external electronic device 200 for which the wireless power sharing is authenticated with the electronic device 100) stored in the first memory (e.g., the first memory 150 of FIG. 3) of the electronic device 100 in advance matches the authentication data included in the first ACK information. When the authentication data stored in the first memory 150 coincides with the authentication data included in the first ACK information, the first processor 140 may determine that the external electronic device 200 that transmits the first ACK information is a valid device for wireless power sharing with the electronic device 100. In an embodiment, when the authentication data stored in the first memory 150 and the authentication data included in the first ACK information do not match, the first processor 140 may allow the first wireless charging circuit 130 to be operated in the wireless charging receive (Rx) function.

In operation 405, as the first processor 140 receives the first ACK information (or, as the external electronic device 200 that transmits the first ACK information is authenticated as the valid device), the first processor 140 may activate the wireless charging Tx function of the electronic device 100. For example, the first processor 140 may allow the first wireless charging circuit 130 to be operated in the wireless charging Tx function, or may transfer a command for activation of the wireless charging Tx function to an application program related to the wireless charging function of the electronic device 100.

In operations 407 and 409, the first processor 140 may control the first wireless charging circuit 130 to transmit a second ping of the WPC standard for performing the wireless charging protocol with the external electronic device 200, and may count a time elapsed after the second ping is transmitted.

In operation 411, within a specified time from the transmission of the second ping, the first processor 140 may receive second ACK information responsive to the second ping from the second wireless charging circuit 210 of the external electronic device 200 through the first wireless charging circuit 130. According to an embodiment, the second ACK information may include at least one information (e.g., a WPC version, a power rating and/or maximum power) related to the wireless charging function of the external electronic device 200.

In an embodiment, when the second ACK information is not received within the specified time from the transmission of the second ping, the first processor 140 may activate the wireless charging Rx function of the electronic device 100. For example, the first processor 140 may switch the wireless charging Tx function of the first wireless charging circuit 130 activated in operation 405 into the wireless charging Rx function such that the wireless power transmission of the electronic device 100 to the external electronic device 200 is not performed. In this regard, the first processor 140 may control the first wireless charging circuit 130 such that the first wireless charging circuit 130 operates in the wireless charging Rx function, or may transfer a command for activation of the wireless charging Rx function to the application program related to the wireless charging function of the electronic device 100.

In operation 413, as the first processor 140 receives the second ACK information within the specified time, the first processor 140 may control the first wireless charging circuit 130 such that the charging current flows through the first conductive coil (e.g., conductive coil 135 shown in FIG. 3) included in the first wireless charging circuit 130.

In operation 415, the induction current may flow in the second wireless charging circuit 210 of the external electronic device 200 in contact with or adjacent to the electronic device 100 due to the charging current flowing through the first conductive coil 135, and the electronic device 100 may wirelessly transmit the power to the external electronic device 200.

Figure 5:
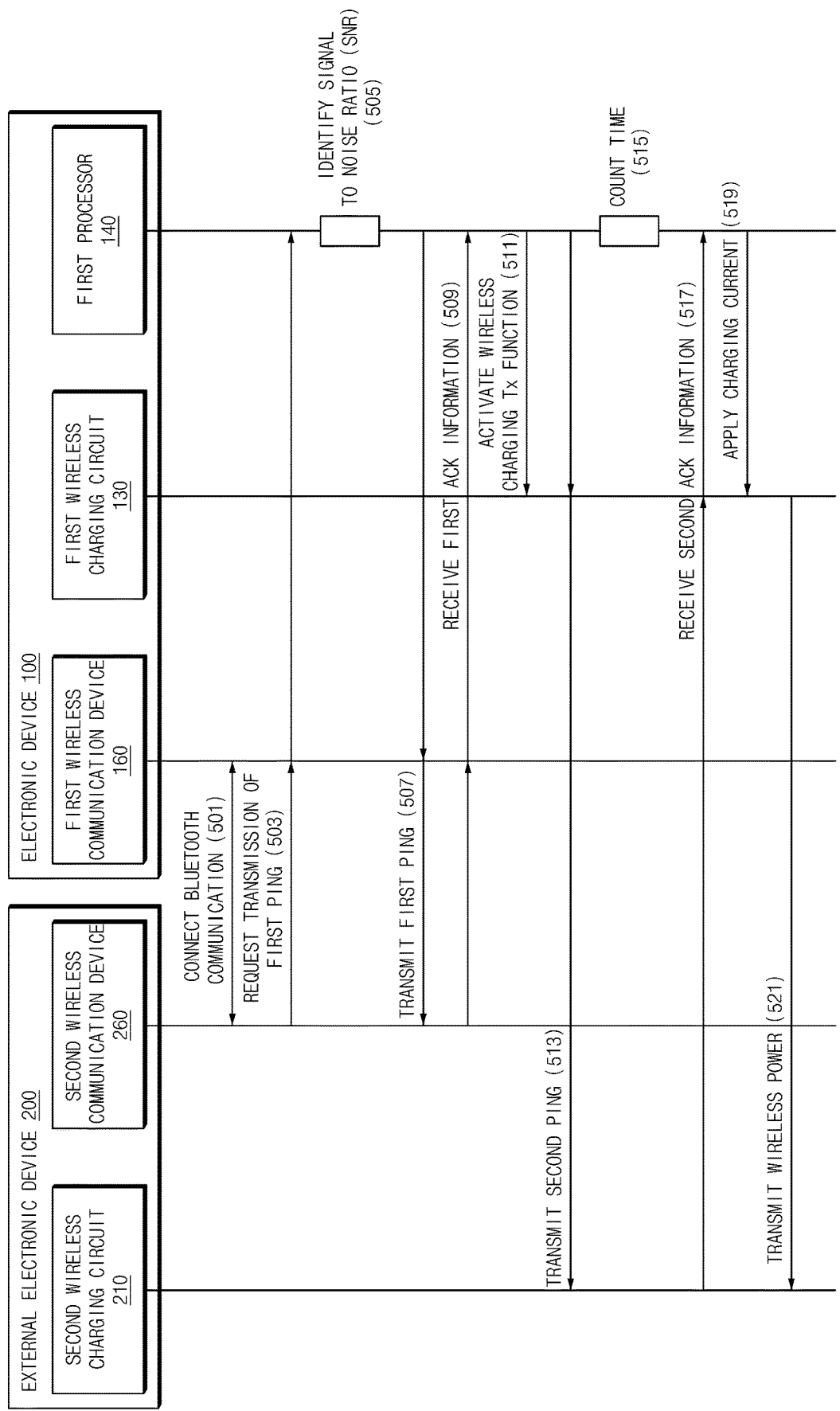
FIG. 5 is a diagram illustrating a signal flow between an electronic device and an external electronic device that share wireless power, according to an embodiment of the disclosure.

FIG. 5 is a diagram illustrating a signal flow between an electronic device and an external electronic device that share wireless power, according to an embodiment of the disclosure.

Referring to FIG. 5, in operation 501, the electronic device 100 may be connected to the external electronic device 200 through the Bluetooth communication. In this regard, the first processor 140 of the electronic device 100 may activate the Bluetooth function of the electronic device 100 in response to user control, and may perform a scanning of the Bluetooth signal in real time or at the specified period by controlling the first wireless communication device 160. When the first processor 140 receives the Bluetooth signal transmitted from the second wireless communication device 260 of the external electronic device 200 with the Bluetooth function activated, the first processor 140 may pair the electronic device 100 with the external electronic device 200 through the Bluetooth communication.

In operation 503, the first processor 140, through the first wireless communication device 160, may receive the signal or data requesting the transmission of the first ping from the second wireless communication device 260 of the external electronic device 200. The first ping may be, for example, a signal for the external electronic device 200 to be recognized by the electronic device 100 or the external electronic device 200 to be authenticated by the electronic device 100.

In operation 505, the first processor 140 may identify a signal to noise ratio (SNR) with respect to the Bluetooth communication between the electronic device 100 and the external electronic device 200 to determine a quality of the Bluetooth communication. In an embodiment, when the SNR value is less than or equal to a specified threshold, the first processor 140 may determine that the quality of the Bluetooth communication between the electronic device 100 and the external electronic device 200 is good, and the first processor 140 may transmit the first ping through the first wireless communication device 160 in operation 507. In an embodiment, when the SNR value exceeds the specified threshold, the first processor 140 may determine that the quality of the Bluetooth communication between the electronic device 100 and the external electronic device 200 is not good, and may exclude the transmission of the first ping.

In one embodiment, each of operations 509 to 521 performed after the first ping transmission according to the operation 507 may correspond to each of operations 403 to 415 described above through FIG. 4, and additional descriptions may be omitted to avoid redundancy.

Figure 6:
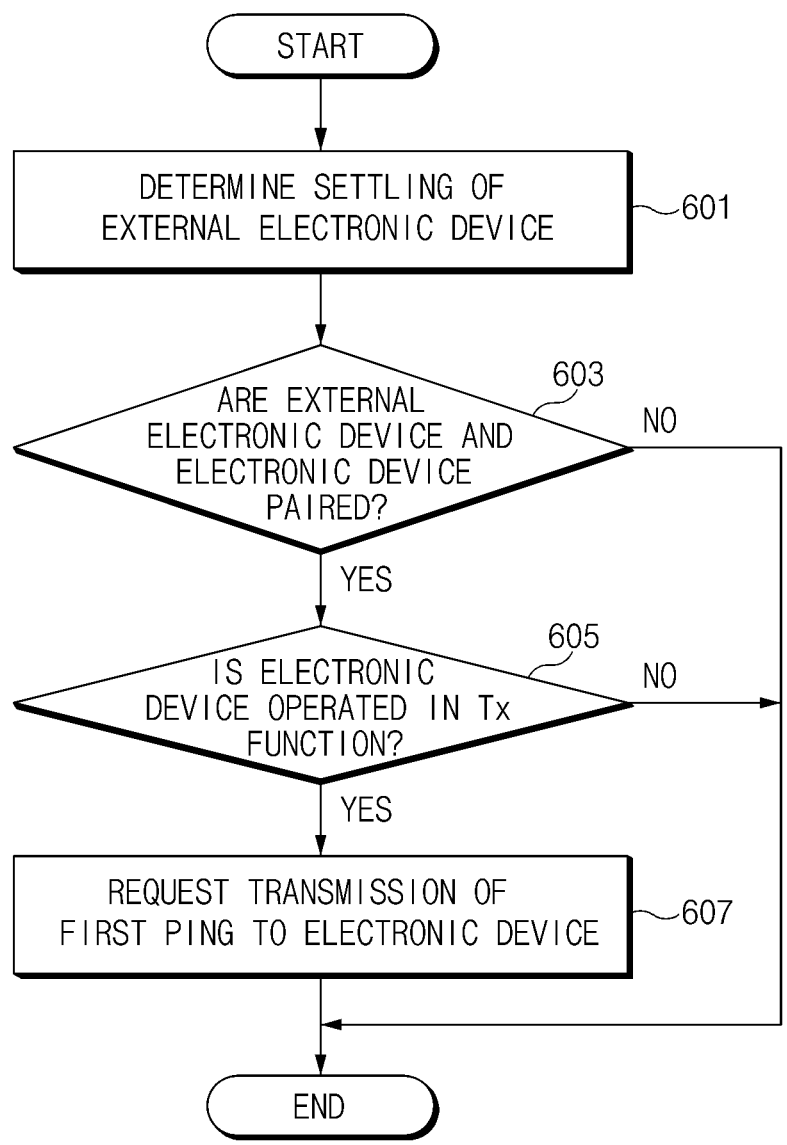
FIG. 6 is a diagram illustrating a first ping request method of an external electronic device to an electronic device according to an embodiment of the disclosure.

FIG. 6 is a diagram illustrating a first ping request method of an external electronic device to an electronic device according to an embodiment of the disclosure.

Referring to FIG. 6, in operation 601, the second processor (e.g., the second processor 240 of FIG. 3) of the external electronic device (e.g., the external electronic device 200 of FIGS. 1A to 5) may determine the settling of the external electronic device 200. In this regard, the external electronic device 200 may include the position sensor (e.g., the six-axis sensor, a gyro sensor, and/or the acceleration sensor), and when the signal or data output by the position sensor does not change for a specified time, the second processor 240 may determine that the external electronic device 200 is settled down. For example, the second processor 240 may determine that the external electronic device 200 is seated on the electronic device (e.g., the electronic device 100 in FIGS. 1A to 5).

In operation 603, the second processor 240 may identify a pairing state, based on the Bluetooth communication connection between the external electronic device 200 and the electronic device 100.

In one embodiment, when the second processor 240 determines that the external electronic device 200 is connected to the electronic device 100 through the Bluetooth communication, in operation 605, the second processor 240 may identify information for the wireless charging function of the electronic device 100 that is received from the electronic device 100 through the Bluetooth communication. For example, the second processor 240 may determine whether the first wireless charging device (e.g., the first wireless charging device 160 of FIGS. 2 to 4) included in the electronic device 100 operates in the wireless charging Tx function.

In one embodiment, when it is determined that the first wireless charging circuit 130 of the electronic device 100 performs the wireless charging Tx function, in operation 607, the second processor 240 may transmit the signal or data requesting the transmission of the first ping to the electronic device 100 through the Bluetooth communication.

Figure 7:
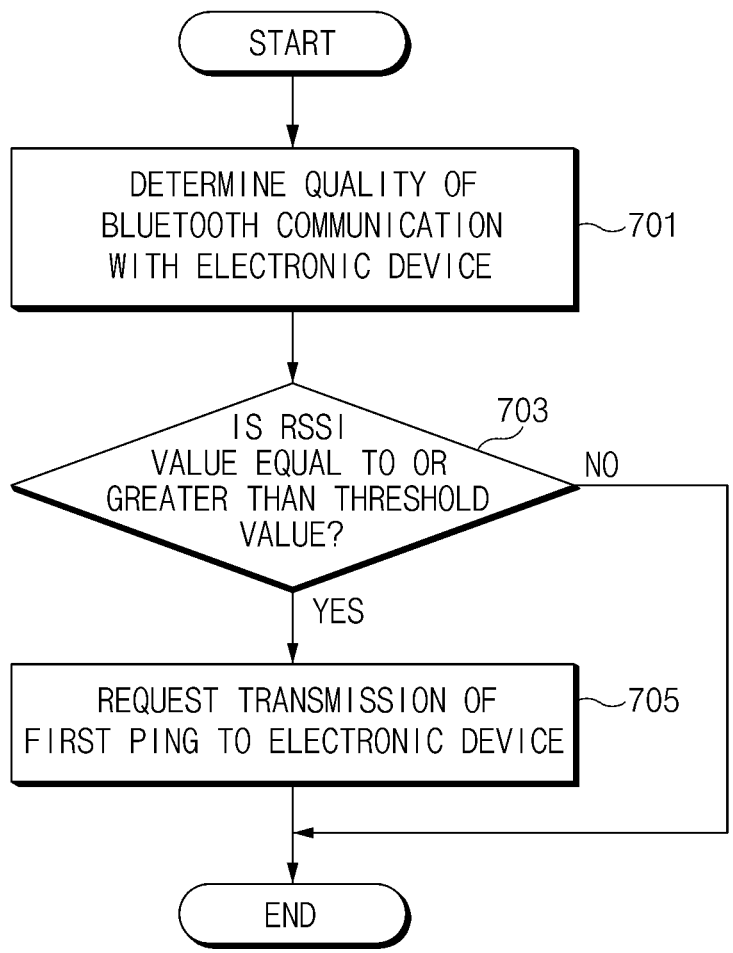
FIG. 7 is a diagram illustrating a first ping request method of an external electronic device to an electronic device according to an embodiment of the disclosure.

FIG. 7 is a diagram illustrating a first ping request method of an external electronic device to an electronic device according to another embodiment of the disclosure.

Referring to FIG. 7, in operation 701, the second processor (e.g., the second processor 240 of FIG. 3) of the external electronic device (e.g., the external electronic device 200 of FIGS. 1A to 5) may determine the quality of the Bluetooth communication with the electronic device (e.g., the electronic device 100 of FIGS. 1A to 5) connected by the Bluetooth communication. For example, the second processor 240 may identify a received signal strength indicator (RSSI) value of the Bluetooth communication.

In operation 703, when it is determined that the RSSI value is equal to or greater than a specified threshold value (or a specified threshold strength), in operation 705, the second processor 240 may determine that the quality of the Bluetooth communication between the external electronic device 200 and the electronic device 100 is good, and may transmit the signal or data requesting the transmission of the first ping to the electronic device 100 through the Bluetooth communication.

According to various embodiments described above, an electronic device (e.g., the electronic device 100) includes a near field communication device (e.g., the first wireless communication device 160), a wireless charging device (e.g., the first wireless charging circuit 130) including a conductive coil, and a processor (e.g., the first processor 140) operatively connected to the near field communication device and the wireless charging device.

According to various embodiments, the processor transmits a first ping using the near field communication device, receives first ACK information responsive to the first ping from an external electronic device, transmits a second ping using the wireless charging device, based on that the first ACK information is received, and controls the wireless charging device such that a charging current flows through the conductive coil when second ACK information responsive to the second ping is received from the external electronic device within a specified time from the transmission of the second ping.

According to various embodiments, the processor may control the wireless charging device such that the wireless charging device is switched from a first function in which the wireless charging device receives a wireless power from the external electronic device to a second function in which the wireless charging device transmits a wireless power to the external electronic device, based on that the first ACK information is received.

According to various embodiments, when the second ACK information is not received from the external electronic device within the specified time from the transmission of the second ping, the processor may control the wireless charging device such that the wireless charging device is switched from the second function to the first function.

According to various embodiments, the electronic device may further include a position sensor.

According to various embodiments, when a front surface of the electronic device is sensed to face a ground using the position sensor, the processor may transmit the first ping using the near field communication device.

According to various embodiments, the processor may determine whether the external electronic device is in contact with the electronic device or is adjacent to the electronic device within a specified distance, based on that the first ACK information is received.

According to various embodiments, the electronic device may further include a hall sensor.

According to various embodiments, when a voltage output from the hall sensor changes, the processor may transmit the first ping using the near field communication device.

According to various embodiments, the electronic device may further include a memory that stores a specified authentication data.

According to various embodiments, the processor may determine whether the specified authentication data is included in the first ACK information, and may control the wireless charging device such that, when the specified authentication data is included in the first ACK information, the wireless charging device is switched from a first function in which the wireless charging device receives a wireless power from the external electronic device to a second function in which the wireless charging device transmits a wireless power to the external electronic device.

According to various embodiments, the processor may control the wireless charging device such that, when the specified authentication data is not included in the first ACK information, the wireless charging device is operated to the first function.

According to various embodiments, the processor may pair the electronic device and the external electronic device by Bluetooth communication, using the near field communication device, and may receive a signal or data requesting the transmission of the first ping from the external electronic device, using the Bluetooth communication.

According to various embodiments, the processor may identify a signal to noise ratio (SNR) value with respect to the Bluetooth communication, and may transmit the first ping using the near field communication device, when the SNR value is less than or equal to a specified threshold.

According to various embodiments, the electronic device may include a smartphone, and the external electronic device may include at least one of the smart phone and a wearable device.

According to various embodiments described above, a method of wireless charging an electronic device includes transmitting a first ping using a near field communication device (e.g., the first wireless communication device 160) of the electronic device (e.g., the electronic device 100), receiving first ACK information responsive to the first ping from an external electronic device (e.g., the external electronic device 200), transmitting a second ping using the wireless charging device (e.g., the wireless charging circuit 130) of the electronic device, based on that the first ACK information is received, and controlling the wireless charging device such that a charging current flows through a conductive coil of the wireless charging device when second ACK information responsive to the second ping is received from the external electronic device within a specified time from the transmission of the second ping.

According to various embodiments, the receiving of the first ACK information may include allowing the wireless charging device to be switched from a first function in which the wireless charging device receives a wireless power from the external electronic device to a second function in which the wireless charging device transmits a wireless power to the external electronic device, based on that the first ACK information is received.

According to various embodiments, the controlling of the wireless charging device may include allowing the wireless charging device to be switched from the second function to the first function, when the second ACK information is not received from the external electronic device within the specified time from the transmission of the second ping.

According to various embodiments, the transmitting of the first ping may include transmitting the first ping when a front surface of the electronic device is sensed to face a ground using a position sensor included in the electronic device.

According to various embodiments, the receiving of the first ACK information may include determining that the external electronic device is in contact with the electronic device or is adjacent to the electronic device within a specified distance, based on that the first ACK information is received.

According to various embodiments, the receiving of the first ACK information may include determining whether specified authentication data is included in the first ACK information.

According to various embodiments, the determining of whether the specified authentication data is included may include, when the specified authentication data is included in the first ACK information, allowing the wireless charging device to be switched from a first function in which the wireless charging device receives a wireless power from the external electronic device to a second function in which the wireless charging device transmits a wireless power to the external electronic device.

According to various embodiments, the determining of whether the specified authentication data is included may include, when the specified authentication data is not included in the first ACK information, allowing the wireless charging device to be operated to the first function.

According to various embodiments, the method of wireless charging may further include pairing the electronic device and the external electronic device by Bluetooth communication, using the near field communication device.

According to various embodiments, the pairing of the electronic device and the external electronic device by the Bluetooth communication may include receiving a signal or data requesting the transmission of the first ping from the external electronic device using the Bluetooth communication.

According to various embodiments, the transmitting of the first ping may include transmitting the first ping when a signal to noise ratio (SNR) value with respect to the Bluetooth communication is less than or equal to a specified threshold.

Figure 8:
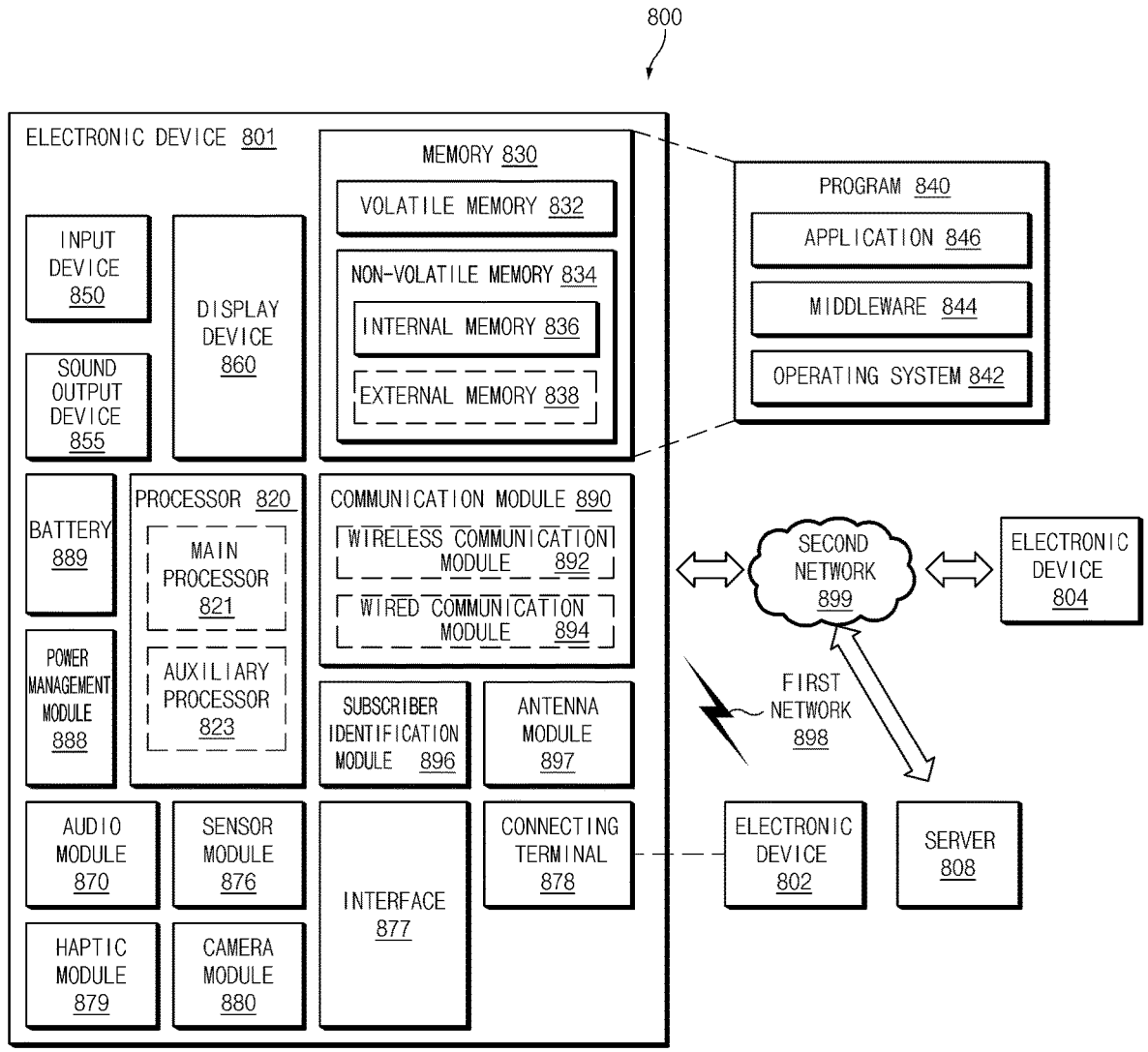
FIG. 8 is a block diagram illustrating an electronic device in a network environment according to various embodiments.

FIG. 8 is a block diagram illustrating an electronic device 801 in a network environment 800 according to various embodiments.

Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In some embodiments, at least one (e.g., the display device 860 or the camera module 880) of the components may be omitted from the electronic device 801, or one or more other components may be added in the electronic device 801. In some embodiments, some of the components may be implemented as single integrated circuitry. For example, the sensor module 876 (e.g., a fingerprint sensor, an iris sensor, or an illuminance sensor) may be implemented as embedded in the display device 860 (e.g., a display).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may load a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, a keyboard, or a digital pen (e.g., a stylus pen).

The sound output device 855 may output sound signals to the outside of the electronic device 801. The sound output device 855 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., PCB). According to an embodiment, the antenna module 897 may include a plurality of antennas. In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in the disclosure, when a wireless charging function (e.g., wireless charging Tx function) of an electronic device is operated, user control for activating the wireless charging function is excluded, convenience for the user may be promoted, and a time required for the wireless charging may be shortened.

According to various embodiments disclosed in the disclosure, a wireless charging function (e.g., wireless charging Tx function) of an electronic device is activated based on a specified authentication with respect to an external electronic device, thereby enabling stable wireless charging between the electronic device and the external electronic device.

In addition, various effects may be provided that are identified directly or indirectly through this document.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a near field communication device;
   a wireless charging device including a conductive coil; and
   at least one processor operatively connected to the near field communication device and the wireless charging device,
   wherein the at least one processor is configured to:
   transmit a first ping, using the near field communication device;
   receive first acknowledgement (ACK) information responsive to the first ping from an external electronic device;
   transmit a second ping, using the wireless charging device, based on the first ACK information being received; and
   control the wireless charging device such that a charging current flows through the conductive coil based on second ACK information responsive to the second ping being received from the external electronic device within a specified time from the transmission of the second ping.

2. The electronic device of claim 1, wherein the at least one processor is further configured to control the wireless charging device such that the wireless charging device is switched from a first function in which the wireless charging device receives a wireless power from the external electronic device to a second function in which the wireless charging device transmits power wirelessly to the external electronic device, based on that the first ACK information is received.

3. The electronic device of claim 2, wherein, based on the second ACK information not being received from the external electronic device within the specified time from the transmission of the second ping, the at least one processor is further configured to control the wireless charging device such that the wireless charging device is switched from the second function to the first function.

4. The electronic device of claim 1, further comprising:
   a position sensor,
   wherein, based on a front surface of the electronic device being sensed to face a ground using the position sensor, the at least one processor is further configured to transmit the first ping using the near field communication device.

5. The electronic device of claim 1, wherein the at least one processor is further configured to determine whether the external electronic device is in contact with the electronic device or is adjacent to the electronic device within a specified distance, based on the first ACK information being received.

6. The electronic device of claim 1, further comprising:
   a memory that stores a specified authentication data,
   wherein the at least one processor is further configured to:
   determine whether the specified authentication data is included in the first ACK information, and
   control the wireless charging device such that, based on the specified authentication data being included in the first ACK information, the wireless charging device is switched from a first function in which the wireless charging device receives a wireless power from the external electronic device to a second function in which the wireless charging device transmits power wirelessly to the external electronic device.

7. The electronic device of claim 6, wherein the at least one processor is further configured to control the wireless charging device such that, based on the specified authentication data not being included in the first ACK information, the wireless charging device is operated to the first function.

8. The electronic device of claim 1, wherein the at least one processor is further configured to:
   pair the electronic device and the external electronic device by Bluetooth communication, using the near field communication device, and
   receive a signal or data requesting the transmission of the first ping from the external electronic device, using the Bluetooth communication.

9. The electronic device of claim 8, wherein the processor is configured to:
   identify a signal to noise ratio (SNR) value with respect to the Bluetooth communication, and
   transmit the first ping using the near field communication device, based on the SNR value being less than or equal to a specified threshold.

10. A method of wireless charging an electronic device, the method comprising:
    transmitting a first ping using a near field communication device of the electronic device;
    receiving first acknowledgement (ACK) information responsive to the first ping from an external electronic device;
    transmitting a second ping using a wireless charging device of the electronic device, based on the first ACK information being received; and
    controlling the wireless charging device such that a charging current flows through a conductive coil of the wireless charging device based on second ACK information responsive to the second ping being received from the external electronic device within a specified time from the transmission of the second ping.

11. The method of claim 10, wherein the receiving of the first ACK information includes allowing the wireless charging device to be switched from a first function in which the wireless charging device receives a wireless power from the external electronic device to a second function in which the wireless charging device transmits power wirelessly to the external electronic device, based on that the first ACK information is received.

12. The method of claim 11, wherein the controlling of the wireless charging device includes allowing the wireless charging device to be switched from the second function to the first function, based on the second ACK information not being received from the external electronic device within the specified time from the transmission of the second ping.

13. The method of claim 10, wherein the transmitting of the first ping includes transmitting the first ping based on a front surface of the electronic device being sensed to face a ground using a position sensor included in the electronic device.

14. The method of claim 10, wherein the receiving of the first ACK information includes determining that the external electronic device is in contact with the electronic device or is adjacent to the electronic device within a specified distance, based on that the first ACK information is received.

15. The method of claim 10,
wherein the receiving of the first ACK information includes determining whether specified authentication data is included in the first ACK information, and
wherein the determining of whether the specified authentication data is included includes, based on the specified authentication data being included in the first ACK information, allowing the wireless charging device to be switched from a first function in which the wireless charging device receives a wireless power from the external electronic device to a second function in which the wireless charging device transmits power wirelessly to the external electronic device.

16. The method of claim 15, wherein the determining of whether the specified authentication data is included includes, based on the specified authentication data not being included in the first ACK information, allowing the wireless charging device to be operated to the first function.

17. The method of claim 10, further comprising:
pairing the electronic device and the external electronic device by Bluetooth communication, using the near field communication device,
wherein the pairing of the electronic device and the external electronic device by the Bluetooth communication includes receiving a signal or data requesting the transmission of the first ping from the external electronic device, using the Bluetooth communication.

18. The method of claim 17, wherein the transmitting of the first ping includes:
based on a signal to noise ratio (SNR) value with respect to the Bluetooth communication being less than or equal to a specified threshold, determining that a quality of the Bluetooth communication between the electronic device and the external electronic device is acceptable, and
based on the quality of the Bluetooth communication between the electronic device and the external electronic device being acceptable, transmitting the first ping.

19. The method of claim 17, further comprising:
based on a signal to noise ratio (SNR) value with respect to the Bluetooth communication being greater than a specified threshold, determining that a quality of the Bluetooth communication between the electronic device and the external electronic device is not acceptable.

20. The method of claim 19, further comprising:
based on the quality of the Bluetooth communication between the electronic device and the external electronic device not being acceptable, excluding the first ping.

* * * * *